(12) United States Patent
Griffiths et al.

(10) Patent No.: US 7,566,260 B1
(45) Date of Patent: Jul. 28, 2009

(54) SPLIT CARCASS WASHER

(76) Inventors: Terry Cemlyn Griffiths, 2762 Elberton Rd., Carlton, GA (US) 30627; Larry Paul Griffiths, 122 David Ave., Collinsville, IL (US) 62234; Duane Dutton, 429 S. Fairway Dr., Pueblo West, CO (US) 81007; Greg Bilyeu, 20850 Irving Rd., Chanute, KS (US) 66720

( * ) Notice: Subject to any disclaimer, the term of this patent is extended or adjusted under 35 U.S.C. 154(b) by 0 days.

(21) Appl. No.: 12/236,764

(22) Filed: Sep. 24, 2008

(51) Int. Cl.
A22C 18/00 (2006.01)
(52) U.S. Cl. ...................................... 452/173
(58) Field of Classification Search .................. 452/71, 452/83, 81, 86–93, 114, 120, 123, 173, 177–184; 15/256.5, 3.1, 3.13, 3.16–3.18, 302, 320, 15/53.1–53.4, 9.6
See application file for complete search history.

(56) References Cited

U.S. PATENT DOCUMENTS

| | | | | | |
|---|---|---|---|---|---|
| 1,837,610 | A | * | 12/1931 | Elias | 15/3.17 |
| 2,719,993 | A | * | 10/1955 | Salkin | 15/3.17 |
| 2,830,311 | A | * | 4/1958 | Vizdos | 15/53.3 |
| 3,431,580 | A | * | 3/1969 | Cirino et al. | 15/302 |
| 3,793,663 | A | * | 2/1974 | Lieffring | 15/53.3 |
| 3,806,978 | A | * | 4/1974 | Takeuchi | 15/53.3 |
| 3,877,107 | A | * | 4/1975 | Cirino | 15/302 |
| 4,179,772 | A | * | 12/1979 | Harben, Jr. | 452/90 |
| 4,514,879 | A | * | 5/1985 | Hazenbroek | 452/91 |
| 4,760,620 | A | * | 8/1988 | Lamore | 15/181 |
| 4,872,238 | A | * | 10/1989 | Crotts et al. | 15/302 |
| 5,167,044 | A | * | 12/1992 | Belanger et al. | 15/4 |
| 5,352,153 | A | * | 10/1994 | Burch et al. | 452/157 |
| 5,367,736 | A | * | 11/1994 | Kaady et al. | 15/53.3 |
| 5,484,332 | A | * | 1/1996 | Leech et al. | 452/173 |
| 5,605,503 | A | * | 2/1997 | Martin | 452/173 |
| 5,806,137 | A | * | 9/1998 | Ishi et al. | 15/302 |
| 5,882,253 | A | * | 3/1999 | Mostoller | 452/173 |
| 6,145,146 | A | * | 11/2000 | Decker | 15/53.2 |
| 7,207,879 | B2 | * | 4/2007 | Kelly et al. | 452/77 |

* cited by examiner

Primary Examiner—Thomas Price (57) ABSTRACT

An apparatus for washing a split animal carcass includes upper and lower pairs of upwardly inclined brushes, leading and trailing vertical brushes, and upper and lower pairs of downwardly inclined brushes. The upwardly inclined brushes are transversely spaced apart from one another to accommodate an animal carcass between them, as are the downwardly inclined brushes. First and second fluid headers are positioned in parallel relation to each inclined brush and three fluid headers are associated with the vertical brushes. The first inclined fluid headers have nozzles aimed at the carcass and the second inclined fluid headers have nozzles aimed at the brushes. Two of the vertical brush fluid headers are aimed at the vertical brushes and the third fluid header is aimed at the carcass.

12 Claims, 3 Drawing Sheets

SPLIT CARCASS WASHER

1. FIELD OF THE INVENTION

This invention relates, generally, to methods for cleaning animal carcasses. More particularly, it relates to apparatus and methods for cleaning a split animal carcass.

2. DESCRIPTION OF THE PRIOR ART

The federal Food and Drug Administration (FDA) banned the use of brushes in animal carcass cleaning plants for many years because the brushes could become contaminated by one product and therefore other products moving through a cleaning station could become cross-contaminated. The present inventors discovered that the original contamination was possible because multiple bristles, each of which has a substantially circular transverse cross-section, were bundled for mounting in circular blind bores formed in brush heads, enabling bacteria to thrive in the interstitial spaces between the bristles. The present inventors solved the contamination problem by reducing the size of each blind bore and mounting a single bristle in each blind bore, thereby eliminating the interstitial spaces and eliminating the bacterial breeding ground. The FDA then lifted the ban and rotating brushes are now allowed to be used in carcass cleaning procedures.

During the ban, carcass cleaning companies relied on oscillating high pressure water jets to perform the cleaning. With the advent of the bacteria-free brushes, most of these companies continued to rely upon water jets because it is not a simple matter to add the new, improved brushes to a cleaning machine. Inventive effort is required as to the proper placement of the brushes, the optimal orientation of the brushes, the length of the individual bristles that collectively form a brush, how the water spray pattern should be adjusted to work with brushes, and so on.

Cleaning a split carcass is problematic. For example, the structure of the cleaning apparatus must take into consideration the fact that the meat side of the carcass has cleaning requirements that differ from the bone side of the carcass.

The known methods include spraying the split carcass with high pressure water, usually with nozzles that oscillate back and forth. The known machines for performing the spraying do not distinguish between the bone side and the meat side of the carcass.

Attempts have been made to improve the cleaning action of the water by increasing its pressure. However, the extra pressure can inhibit the oscillation of the nozzles so what is gained in pressure is lost in coverage.

Cleaning with water alone, or brushes alone, however, does not guarantee a clean product. The placement of the brushes, their direction of rotation, the length of their bristles, how the brushes are used in conjunction with spray nozzles, and so on cooperate to produce a clean product.

Thus there is a need for a split carcass cleaning method and apparatus that uses both brushes and water sprays in an optimal way.

More particularly, there is a need for methods that teach an optimal placement and orientation of brushes and water sprays relative to one another.

There is a need as well for an apparatus that incorporates brushes having bristles that perform more effectively than conventional bristles.

There is also a need for an apparatus that cleans the meat and bone sides of the split carcass in different ways.

However, in view of the prior art taken as a whole at the time the present invention was made, it was not obvious to those of ordinary skill how the identified needs could be fulfilled.

SUMMARY OF THE INVENTION

The long-standing but heretofore unfulfilled need for an improved split carcass cleaning method and apparatus is now met by a new, useful, and non-obvious invention.

The inventive structure in its basic form is a novel assembly of brushes and fluid headers for cleaning the meat and the bone side of a split carcass.

The novel assembly has an elongate structure and includes an entrance end and an exit end. The brushes and fluid headers are arranged into a first, lower pair of upwardly inclined brushes and associated fluid headers where the brushes of said lower pair are transversely spaced apart from one another by a distance sufficient to receive a split carcass therebetween, a second, upper pair of upwardly inclined brushes and associated fluid headers where the brushes of said upper pair are transversely spaced apart from one another by a distance sufficient to receive a split carcass therebetween, a first, lower pair of downwardly inclined brushes and fluid headers where the brushes of said downwardly inclined lower pair are transversely spaced apart from one another by a distance sufficient to receive a split carcass therebetween, and a second, upper pair of downwardly inclined brushes and fluid headers where the brushes of said downwardly inclined upper pair are transversely spaced apart from one another by a distance sufficient to receive a split carcass therebetween that are transversely spaced apart from one another by a distance sufficient to receive a split carcass therebetween.

There are two (2) elongate fluid headers associated with each upwardly or downwardly inclined brush. Each fluid header is about as long as its associated brush. One (1) fluid header sprays water or a mixture of water and cleaning agents onto the product and the other fluid header sprays water or said mixture on to the brushes. A plurality of water or other liquid fluid-emitting nozzles is formed along the extent of each fluid header. Each nozzle produces a flat, fan-shaped spray.

A first vertical brush is positioned in trailing relation to the lower upwardly inclined brushes and a second vertical brush is positioned in trailing relation to the first vertical brush in leading relation to the downwardly inclined lower brushes on the meat side only of the apparatus. Three (3) vertical fluid headers are associated with each vertical brush; one (1) provides a spray onto the product and the other two (2) spray on opposite sides of the brush.

The carcass being cleaned is suspended on an overhead conveyor that transports the carcass into the assembly of brushes and fluid headers at the entrance end, carries it the extent of the assembly where it is brushed and sprayed, and carries it out of the exit end of the assembly for further treatment. The path of travel of the carcass is coincident with a longitudinal axis of symmetry of the assembly.

The nozzles of the first fluid header of each pair of inclined fluid headers are aimed just above the radially outermost ends of the bristles of each brush so that the water does not contact the brush to any appreciable extent. The water therefore impacts against the carcass and flows downwardly over the carcass under the influence of gravity and under the action of the brushes.

The nozzles of the second fluid header of each pair of inclined fluid headers are aimed at the bristles of the rotating brush with which the second fluid header is associated, near an upper end thereof, so that the bristles, also known as appendages, are cleaned.

The split carcass is first brushed by the first, lower pair and the second, upper pair of transversely spaced apart brushes that are collectively inclined at about a forty five degree (45°) upwardly inclined angle. Space requirements may require a thirty five degree (35°) angle. These upwardly inclined brushes are positioned near the entrance end of the housing. There are four (4) upwardly inclined brushes and eight (8) upwardly inclined fluid headers associated therewith.

A pair of longitudinally spaced apart vertical brushes, i.e., brushes that rotate about a vertical axis, follows the upwardly inclined lower pair of brushes and provide a horizontal attack angle on the most critical area of the split carcass. This pair of vertical brushes is referred to as the middle set of brushes because it is positioned mid-length of the assembly. These vertical brushes are positioned only on the meat side of the carcass if all of the carcasses are oriented in the same way. However, if carcasses are hung randomly, some with meat on one side and some with bones on the same side, then in such event the vertical brushes should be mounted on both sides of the apparatus.

The middle set is followed by a first, lower pair and a second, upper pair of transversely spaced apart brushes that are downwardly inclined at about a forty five degree (45°) angle. These downwardly inclined brushes are positioned near the exit end of the assembly. Space requirements may require a thirty five degree (35°) angle.

The upwardly inclined brushes counter-rotate in a downward direction, as do the downwardly inclined brushes. The middle set of vertical brushes includes a leading brush that rotates in a direction away from the entrance end of the housing and a trailing brush that rotates in a direction away from the exit end of the housing.

The fluid headers that are associated with brushes are strategically positioned along the length of the upwardly inclined, downwardly inclined, and vertical sets of brushes, respectively. There are also a pair of vertically disposed final rinse vertical fluid headers not associated with any brush, there being one vertically disposed final rinse fluid header mounted at the trailing end of the machine on the meat side and one on the bone side.

More particularly, there are two inclined fluid headers for each inclined brush, one vertical fluid header for each vertical brush, one horizontal header shared by the two vertical brushes, and two transversely spaced apart vertical final rinse brushes at the exit end of the machine.

Each fluid header includes a plurality of equidistantly spaced apart nozzles formed therein along the length thereof.

In a preferred embodiment, each set of two inclined fluid headers includes an upper fluid header and a lower fluid header, both of which are positioned in a common vertical plane. The nozzles in the upper fluid header are aimed to impact the split carcass, barely missing the outermost ends of the rotating bristles of the brushes. The nozzles in the lower fluid header are aimed at the brushes as they complete their downward rotation so that the water from the lower fluid header is dedicated to brush cleaning.

The flat, fan-shaped spray enables the water to be aimed at its intended target to minimize wastage of water.

Each brush is formed by a shaft having bristles or appendages secured to it. A motor is provided to rotate each shaft. One motor may also be used to rotate more than one shaft by use of well-known belt and pulley assemblies.

The split carcass is initially cleaned by the upwardly inclined brushes and their associated fluid headers. The meat side of the split carcass then passes by the leading and trailing vertical brushes and their associated fluid headers. The penultimate cleaning is administered by the downwardly inclined brushes and their associated fluid headers and the final rinse is provided by the vertical fluid headers at the exit end of the apparatus.

An important object of this invention is to thoroughly clean split carcasses with a combination of water or other liquid fluid and mechanical brushing.

A closely related object is to accomplish the foregoing object while using a minimum amount of water or other liquid fluid.

A more specific object is to disclose the optimum arrangement of brushes and fluid headers in a split carcass washing apparatus.

Still another object is to advance the art of brushes by disclosing bristles having greater cleaning power than the bristles of known brushes.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
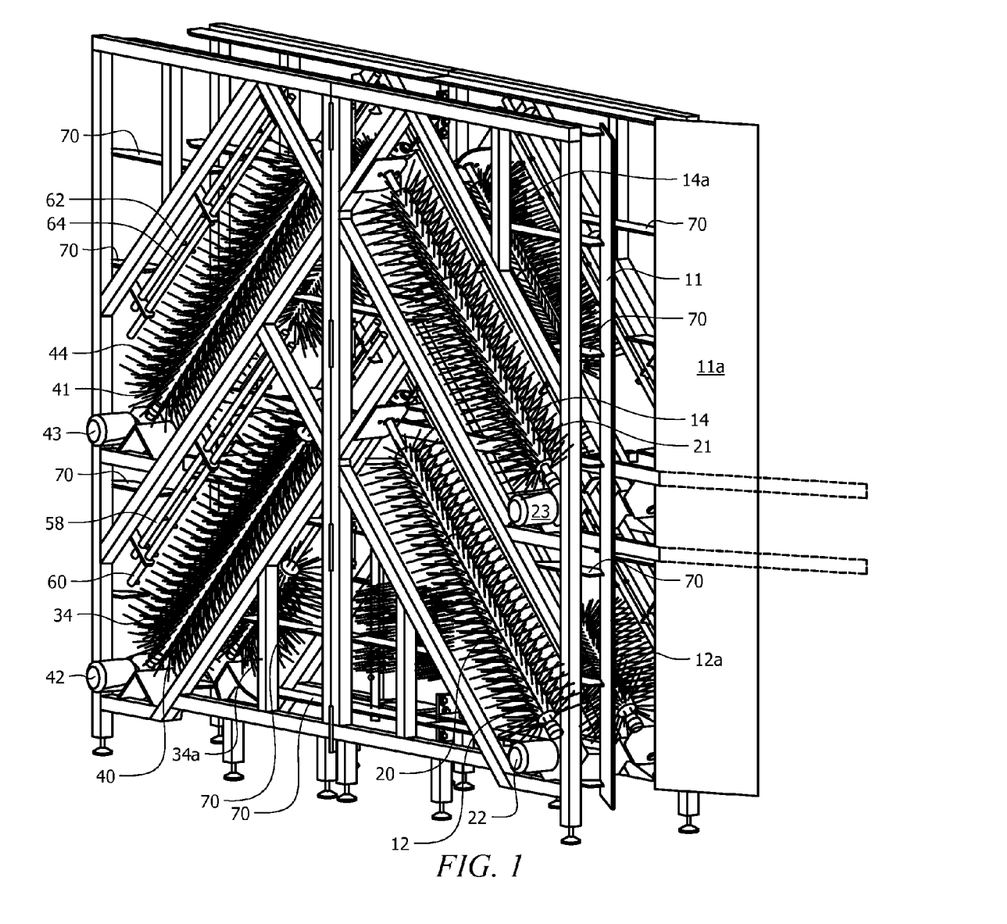
FIG. 1 is a perspective view of the novel split carcass washer assembly from the entrance end with the meat brushes in the foreground and the bone brushes in the background.

Referring now to FIG. 1, it will there be seen that an illustrative embodiment of the invention is denoted as a whole by the reference numeral 10.

Novel assembly 10 includes ten (10) motor-driven rotating shafts upon which are mounted brushes of varying lengths. Eight (8) of the ten (10) are upwardly or downwardly inclined and two (2) are vertically disposed.

Figure 2:
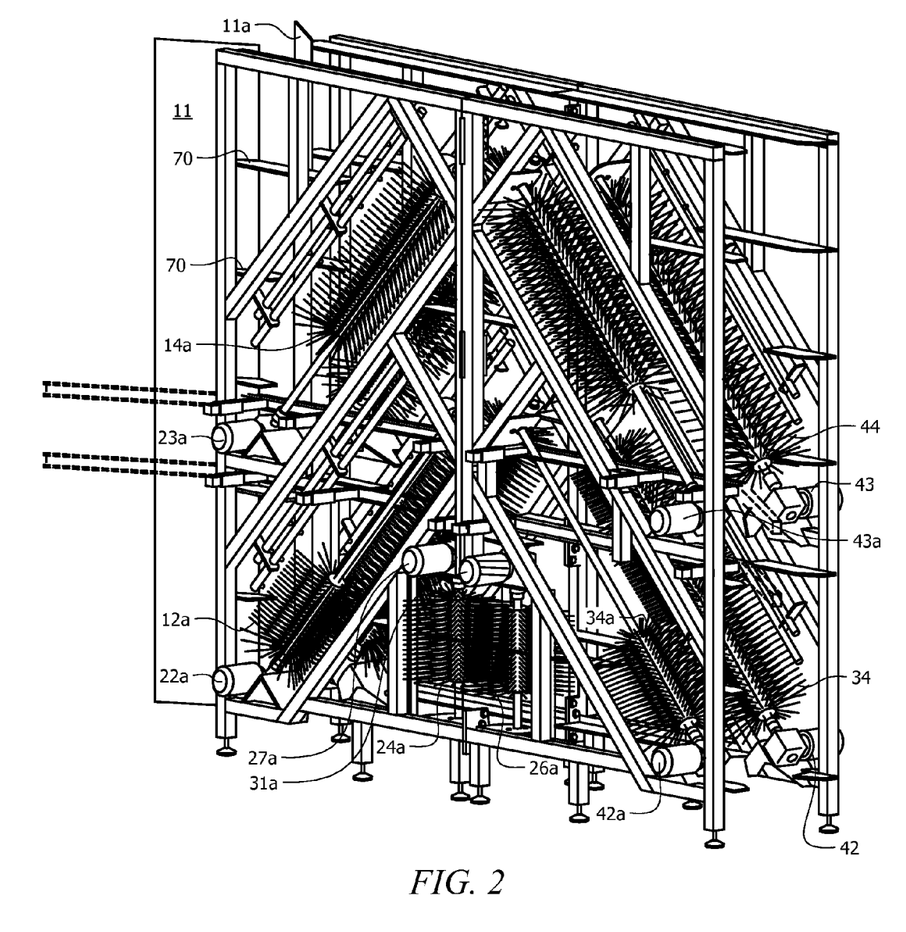
FIG. 2 is a perspective view of the novel split carcass washer assembly from the exit end with the bone brushes in the foreground and the meat brushes in the background.
Figure 3:
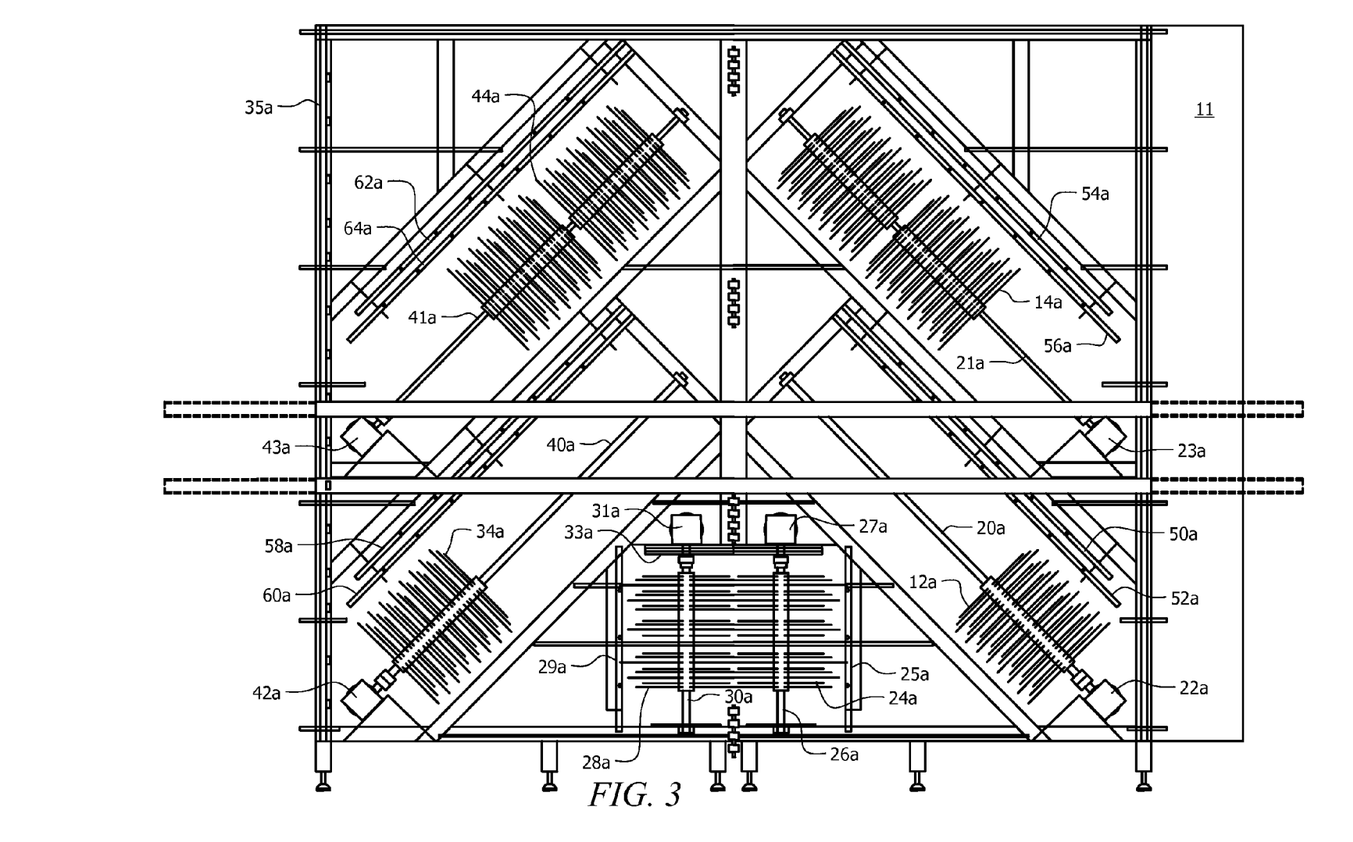
FIG. 3 is a side elevational view of the bone side of the novel split carcass washer assembly with the brushes depicted in diagrammatic form.

The four (4) inclined brushes in the foreground of FIG. 1 are full-length, meat-side brushes. However, as depicted in FIGS. 2 and 3, there are four (4) inclined brushes and two (2) vertical brushes on the bone side of the apparatus, and none of said brushes are full-length brushes.

Advantageously, a full-length brush is made of three (3) truncate brushes on a common shaft. A truncate brush is made by mounting only one (1) truncate brush on a shaft and a medium-length brush is made by mounting two (2) truncate brushes on a common shaft.

In FIG. 1, the entrance of the apparatus is at the right side of the drawing. The lower pair of upwardly inclined brushes is denoted 12 and 12*a* and the upper pair of upwardly inclined brushes is denoted 14 and 14*a*. As best understood in a comparison of FIGS. 1 and 3, lower meat-side brush 12 is a full-length brush, lower bone-side brush 12a is a truncate brush, upper meat-side brush 14 is full-length, and upper bone-side brush 14a is medium-length.

Lower upwardly inclined brushes 12 and 12a are transversely spaced from one another by a distance sufficient for a split carcass to pass therebetween, as are upper upwardly inclined brushes 14 and 14a. More particularly, a carcass to be washed is suspended from an overhead conveyance and follows a path of travel between the transversely spaced apart brushes, traveling from right-to-left in the view of FIGS. 1 and 3 and left-to-right in FIG. 2.

Flat guide plates 11, 11a extend the entire height of apparatus 10 and are mounted at the entrance end thereof in converging relation to one another to align a split carcass with the longitudinal axis of symmetry of apparatus 10.

Brushes 12, 12a rotate toward one another as do brushes 14, and 14a. This counter-rotation brings the individual bristles of the brushes towards a carcass entering the assembly at the entrance end thereof. The contaminants on a carcass are therefore brushed off the carcass in a generally downwardly direction by the lower and upper upwardly inclined brushes, beginning at respective lower ends thereof and ending at respective upper ends thereof.

More particularly, the mirrored brushes, i.e., the upwardly inclined and downwardly inclined (declined) brushes cooperate to clean the leading and trailing ends of the carcass. With all brushes rotating downwardly, both the leading and trailing ends of the carcass are addressed with the brushes mounted at opposing angles. A carcass is thus cleaned from its bottom to its top as it passes between the upwardly inclined brushes and from its top to its bottom as it passes between the downwardly inclined brushes.

The elongate shaft 20 upon which lower brush 12 is mounted is inclined upwardly at a forty five degree (45°) angle. Motor 22 is connected in driving relation to said shaft through a suitable speed-reducing gearbox. As best depicted in FIG. 3, lower brush 12a is mounted on a common shaft 20a (FIG. 3) that is also inclined upwardly at a forty five degree (45°) angle. Motor 22a is connected in driving relation to shaft 20a through a suitable speed-reducing gearbox.

Elongate shaft 21 upon which upper brush 14 is mounted is inclined upwardly at a forty five degree (45°) angle. Motor 23 is connected in driving relation to said shaft through a suitable speed-reducing gearbox. Upper brush 14a (FIG. 3) is mounted on shaft 21a that is also inclined upwardly at a forty five degree (45°) angle. Motor 23a is connected in driving relation to shaft 21a through a suitable speed-reducing gearbox.

Truncate vertical brush 24a is mounted on vertical shaft 26a and truncate vertical brush 28a is mounted on vertical shaft 30a. Vertical shafts 26a and 30a are disposed in parallel relation to one another on the bone side only of machine 12. Motor 27a is connected in driving relation to vertical shaft 26a and motor 31a is connected in driving relation to vertical shaft 30a so that said shafts rotate at a common number of revolutions per minute (rpm) but in opposite directions.

After a carcass has passed between the upper and lower upwardly inclined brushes 12, 12a, 14, and 14a, it passes said truncate vertical brushes 24a, 28a on the bone side of the apparatus as aforesaid. Said truncate vertical brushes counter-rotate with respect to one another with leading brush 24a rotating in the direction of the path of travel of the carcass. Thus, contaminants are brushed toward the exit end of assembly 10 by brush 24a and towards the entrance end by brush 28a.

Lower full-length brush 34 is mounted on shaft 40 that is inclined downwardly at a forty five degree (45°) angle. Motor 42 is connected in driving relation to shaft 40 through a suitable speed-reducing gearbox.

Lower truncate downwardly inclined brush 34a is mounted on shaft 40a that is inclined downwardly at a forty five degree (45°) angle in parallel relation to shaft 40. Motor 42a is connected in driving relation to shaft 40a through a suitable speed-reducing gearbox.

Upper full-length brush 44 is mounted on shaft 41 that is inclined downwardly at a forty five degree (45°) angle. Motor 43 is connected in driving relation to shaft 41 through a suitable speed-reducing gearbox.

Upper medium-length downwardly inclined brush 44a (FIG. 3) is mounted on shaft 41a that is inclined downwardly at a forty five degree (45°) angle in parallel relation to shaft 40a. Motor 43a is connected in driving relation to shaft 41a through a suitable speed-reducing gearbox.

It will be observed in FIG. 3 that the bristles or appendages of the brushes are provided in three (3) differing lengths, i.e., long, medium-length, and short. These bristles of differing lengths are provided for all of the brushes, including the upwardly inclined brushes, the vertical brushes, and the downwardly inclined brushes. It has been determined that the cleaning efficiency of a brush is reduced if all of its bristles have a common length. The cleaning efficiency improves if half the bristles are long and half are short and still further efficiency is provided if one-third of the bristles are long, one-third short, and one-third of medium length roughly halfway between the lengths of the long and short bristles.

There are two (2) fluid headers associated with each upwardly or downwardly inclined brush. Each set of two (2) fluid headers includes an upper fluid header and a lower fluid header, and said upper and lower fluid headers are positioned in a common vertical plane so that the upper fluid header is directly above the lower fluid header. Each fluid header includes a plurality of equidistantly spaced apart nozzles along its length. In a preferred embodiment, each nozzle forms a flat, fan-shaped spray.

The nozzles in the upper fluid header are aimed to impact the product, barely missing the outermost ends of the rotating bristles of the brushes so that water or a water/cleaning agent mixture from the upper fluid header is dedicated to washing the product. The nozzles in the lower fluid header are aimed at the bristles or appendages as they complete their downward rotation so that the water or water/cleaning agent mixture from the lower fluid header is dedicated to brush cleaning and so that the water or mixture is applied to the brushes at the optimal moment. The flat, fan-shaped spray enables the liquid to be aimed at its intended target to minimize wastage of water.

The upwardly inclined fluid headers at the entrance end of apparatus 10 are hard or impossible to see in FIG. 1, although some of them can be seen in the reverse view of FIG. 2. Similarly, some of the downwardly inclined fluid headers at the exit end of the apparatus can be seen in FIG. 1 but not in FIG. 2. However, in FIG. 3 which depicts the bone side only of apparatus 10, all of the inclined fluid headers are depicted.

Referring therefore to FIG. 3, it will there be seen that the upper fluid header for upwardly inclined brush 12a is denoted 50a and the lower fluid header for said brush is denoted 52a. The flat, fan-shaped spray of water (or other liquid fluid) emanating from the nozzles of upper fluid header 50a just barely misses the radially outermost ends of the bristles of brush 12a and impacts upon the carcass. The flat, fan-shaped spray of water (or other liquid fluid) emanating from the nozzles of lower fluid header 52a impacts the bristles of brush 12a, thereby cleaning said bristles.

The upper fluid header associated with upper upwardly inclined brush 14 is denoted 54a and the lower fluid header for said brush is denoted 56a. The flat, fan-shaped spray of water (or other liquid fluid) emanating from the nozzles of upper fluid header 54a just barely misses the radially outermost ends of the bristles of brush 14a and impacts upon the carcass. The flat, fan-shaped spray of water (or other liquid fluid) emanating from the nozzles of lower fluid header 56a impacts the bristles of brush 14a, thereby cleaning said bristles.

The upper fluid header associated with lower downwardly inclined brush 34a is denoted 58a and the lower fluid header for said brush is denoted 60a. The flat, fan-shaped spray of water or other liquid fluid emanating from the nozzles of upper fluid header 58a just barely misses the radially outermost ends of the bristles of brush 34a and impacts the carcass. The flat, fan-shaped spray of water (or other liquid fluid) emanating from the nozzles of lower fluid header 60a impacts the bristles of said brush 34a, thereby cleaning said bristles.

The upper fluid header associated with upper downwardly inclined brush 44a is denoted 62a and the lower fluid header for said brush is denoted 64a. The flat, fan-shaped spray of water or other liquid fluid emanating from the nozzles of upper fluid header 62a just barely misses the radially outermost ends of the bristles of brush 44a and impacts the carcass. The flat, fan-shaped spray of water (or other liquid fluid) emanating from the nozzles of lower fluid header 64a impacts the bristles of said brush 44a, thereby cleaning said bristles.

There are three fluid headers associated with vertical brushes 24a and 28a. First vertical fluid header 25a is mounted substantially parallel to leading vertical brush 24a in leading relation thereto and second vertical fluid header 29a is mounted substantially parallel to trailing vertical brush 28a in trailing relation thereto. The nozzles of said vertical fluid headers form a flat, fan-shaped spray and are aimed at the bristles of their respective brushes. The third fluid header 33a is horizontally disposed and is mounted above vertical brushes 24a, 28a in substantially centered relation thereto. The nozzles of horizontal fluid header 33a form a flat, fan-shaped spray and are aimed at the split carcass.

Two final rinse vertical headers 35 (not shown in FIG. 3) and 35a have a height substantially equal to the height of apparatus 10 and are positioned in transversely spaced apart relation to one another on opposite sides of the apparatus. Each of said final rinse fluid headers has a plurality of nozzles, each of which provides a flat, fan-shaped spray and each of which is aimed at the product as it exits the apparatus.

As depicted in FIG. 1, the meat side of the novel assembly does not include truncate vertical brushes and therefore it does not include the vertical fluid headers associated therewith. The meat side includes two upwardly inclined full length brushes 12, 14 and two downwardly inclined full length brushes 34, 44.

As depicted in FIG. 3, the bone side includes a lower upwardly inclined truncate brush 12a, an upper upwardly inclined medium-length brush 14a, leading and trailing truncate vertical brushes 24a, 28a, respectively, a lower downwardly inclined truncate brush 34a and an upper downwardly inclined medium-length brush 44a.

FIG. 3 depicts the bone side of an embodiment having utility for those carcasses where kidneys and the fat surrounding them are still on the carcass when it arrives for cleaning. It was mentioned above that each full-length brush is preferably formed of three (3) shorter brushes. In this embodiment, the upwardly and downwardly inclined lower brushes are formed of short or truncate brushes only as depicted and the upwardly and downwardly inclined upper brushes are formed of two (2) short or truncate brushes as depicted and are therefore characterized as mid-length brushes. More particularly, the lower brushes include only the lowermost brushes and the upper brushes include only the two (2) highest brushes. In this way, no brushes are provided in the kidney area. In a variation of this structure, not depicted, the lower brushes could be formed of two brushes each and the upper brushes could be formed of two (2) mid-length brushes each as depicted in FIG. 4 or of only one (1) uppermost truncate brush. In still another alternative embodiment, the same number of brushes could be used as in the embodiments of FIGS. 1-3 where no kidneys and surrounding fat are present, but the brushes aligned with the kidney area would have shorter bristles so as not to abrade and burst the kidneys. The meat side of this embodiment is the same as the meat side of the other embodiments.

These brushes and their associated fluid headers cooperate to clean a split animal carcass thoroughly with a minimum amount of water.

Static guides, collectively denoted 70, are rigid flat plates that are horizontally mounted on the frame of apparatus 10 at various levels to prevent the carcass from getting hung-up or otherwise impeded by the framework of apparatus 10.

The truncate, medium-length, and full-length brushes depicted herein collectively form a preferred embodiment. However, the novel apparatus will still work if all of the brushes are full-length or if some of the truncate brushes are medium-length, and so on. The novel method of cleaning, therefore, is not restricted to brushes of any particular length. In the claims that follow, substitution of a brush of a different length than the claimed length shall be deemed within the scope of the claims under the doctrine of equivalents.

It should also be observed that in a preferred embodiment, the nozzles of a fluid header extend along the length of the fluid header for a distance substantially equal to the length of the associated brush. The fluid header for a full length brush therefore has nozzles formed therein along its entire length. The fluid header for a medium-length brush has nozzles formed therein along about two-thirds of its length, and the fluid header for a truncate brush has nozzles formed therein along about one-third of its length.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. An apparatus for washing a split animal carcass, comprising:
   a lower pair of longitudinally disposed, parallel, upwardly inclined, elongate shafts sharing a common angle of inclination;
   said lower pair of shafts including a first and a second shaft that are transversely spaced apart from one another by a distance sufficient to accommodate an animal carcass therebetween;
   a plurality of radially disposed appendages secured to said first shaft, collectively forming a first upwardly inclined full-length brush;

a second plurality of radially disposed appendages secured to said second shaft, collectively forming a first upwardly inclined truncate brush;

an upper pair of longitudinally disposed, parallel, upwardly inclined, elongate shafts sharing a common angle of inclination;

said upper pair of shafts including a third and a fourth shaft that are transversely spaced apart from one another by a distance sufficient to accommodate an animal carcass therebetween;

a plurality of radially disposed appendages secured to said third shaft, collectively forming a second upwardly inclined full-length brush;

a plurality of radially disposed appendages secured to said fourth shaft, collectively forming a first upwardly inclined medium-length brush;

a lower pair of longitudinally disposed, parallel, downwardly inclined, elongate shafts sharing a common angle of inclination;

said lower pair of shafts including a fifth and a sixth shaft that are transversely spaced apart from one another by a distance sufficient to accommodate an animal carcass therebetween;

a plurality of radially disposed appendages secured to said fifth shaft, collectively forming a first downwardly inclined full-length brush;

a plurality of radially disposed appendages secured to said sixth shaft, collectively forming a second downwardly inclined truncate brush;

an upper pair of longitudinally disposed, parallel, downwardly inclined, elongate shafts sharing a common angle of inclination;

said upper pair of shafts including a seventh and an eighth shaft that are transversely spaced apart from one another by a distance sufficient to accommodate an animal carcass therebetween;

a plurality of radially disposed appendages secured to said seventh shaft, collectively forming a second downwardly inclined full-length brush; and a plurality of radially disposed appendages secured to said eighth shaft, collectively forming a first downwardly inclined medium-length brush;

whereby said first, third, fifth, and seventh shafts carrying said full-length brushes constitute a meat-side of the apparatus;

whereby said second, fourth, sixth, and eighth shafts carrying said truncate, mid-length, truncate, and mid-length brushes, respectively, constitute a bone-side of the apparatus;

whereby the upwardly inclined brushes are positioned at an entrance end of the apparatus; and whereby the downwardly inclined brushes are positioned at an exit end of the apparatus.

2. The apparatus of claim 1, further comprising:

a pair of vertically disposed, parallel, truncate shafts;

said pair of shafts including ninth and tenth shaft that are longitudinally spaced apart from one another on said bone side of said apparatus;

a plurality of radially disposed appendages secured to said ninth shaft, collectively forming a first vertical truncate brush;

a plurality of radially disposed appendages secured to said tenth shaft, collectively forming a second vertical truncate brush; and said first and second truncate brushes being positioned between said upwardly inclined truncate brush and said downwardly inclined truncate brush on said bone side of said apparatus.

3. The apparatus of claim 2, further comprising:

a first and second fluid header positioned in substantially parallel relation to said lower, upwardly inclined full-length brush;

a first and second fluid header positioned in substantially parallel relation to said lower, upwardly inclined truncate brush;

a first and second fluid header positioned in substantially parallel relation to said upper, upwardly inclined full-length brush;

a first and second fluid header positioned in substantially parallel relation to said upper, upwardly inclined medium-length brush;

a first and second fluid header positioned in substantially parallel relation to said lower, downwardly inclined full-length brush;

a first and second fluid header positioned in substantially parallel relation to said lower, downwardly inclined truncate brush;

a first and second fluid header positioned in substantially parallel relation to said upper, downwardly inclined full-length brush; and a first and second fluid header positioned in substantially parallel relation to said upper, downwardly inclined medium-length brush.

4. The apparatus of claim 3, further comprising:

a vertical fluid header positioned in substantially parallel relation to said first vertical brush;

a vertical fluid header positioned in substantially parallel relation to said second vertical brush;

a horizontal fluid header positioned above and in substantially centered relation to said first and second vertical brushes;

said vertical fluid header of said first vertical brush having nozzles adapted to spray a liquid onto said first vertical brush;

said vertical fluid header of said second vertical brush adapted to spray a liquid onto said second vertical brush; and said horizontal fluid header adapted to spray water onto said carcass.

5. The apparatus of claim 1, further comprising:

each of said first and second fluid headers including a plurality of nozzles along their respective extents and being disposed in a common inclined vertical plane;

each of said first fluid headers being disposed above its associated second fluid header;

each of said first fluid headers having nozzles aimed so that substantially all liquid fluid emitted by said first fluid headers impinges upon said carcass at a location above an associated brush;

each of said second fluid headers having nozzles aimed so that substantially all liquid fluid emitted by said second fluid headers impinges upon their associated brush.

6. The apparatus of claim 5, further comprising:

each nozzle of said plurality of nozzles forming a flat, fan-shaped pattern of liquid fluid.

7. The apparatus of claim 1, further comprising:

each of said brushes having appendages of differing lengths.

8. The apparatus of claim 7, further comprising:

said appendages of differing lengths including a plurality of short appendages, a plurality of long appendages, and a plurality of appendages having a length substantially midway between said short and long appendages.

9. The apparatus of claim 1, further comprising:
a first final rinse vertical header having a height substantially equal to a height of the apparatus mounted to the exit end of the apparatus on the meat side thereof and adapted to rinse the carcass as the carcass exits the apparatus; and
a second final rinse vertical header having a height substantially equal to a height of the apparatus mounted to the exit end of the apparatus on the bone side thereof and adapted to rinse the carcass as the carcass exits the apparatus.

10. A method of washing the neck area of a carcass, comprising the steps of:
providing a lower pair of longitudinally disposed, parallel, upwardly inclined, elongate shafts sharing a common angle of inclination;
positioning said lower pair of shafts including, a first and a second shaft, so that said first and second shafts are transversely spaced apart from one another by a distance sufficient to accommodate an animal carcass therebetween;
attaching a plurality of radially disposed appendages to said first shaft, collectively forming a first upwardly inclined brush;
positioning a first and second fluid header adjacent said upwardly inclined brush and adapting said first fluid header to spray liquid onto said carcass and said second fluid header to spray liquid onto said upwardly inclined brush;
attaching a second plurality of radially disposed appendages to said second shaft, collectively forming a second upwardly inclined brush;
positioning a first and second fluid header adjacent said upwardly inclined second brush and adapting said first fluid header to spray liquid onto said carcass and said second fluid header to spray liquid onto said upwardly inclined second brush;
providing an upper pair of longitudinally disposed, parallel, upwardly inclined, elongate shafts sharing a common angle of inclination;
positioning said upper pair of shafts, including a third and a fourth shaft, so that said third and fourth shafts are transversely spaced apart from one another by a distance sufficient to accommodate an animal carcass therebetween;
attaching a plurality of radially disposed appendages to said third shaft, collectively forming a third upwardly inclined brush;
positioning a first and second fluid header adjacent said third upwardly inclined brush and adapting said first fluid header to spray liquid onto said carcass and said second fluid header to spray liquid onto said third upwardly inclined brush;
attaching a plurality of radially disposed appendages to said fourth shaft, collectively forming an upwardly inclined fourth brush;
positioning a first and second fluid header adjacent said upwardly inclined fourth brush and adapting said first fluid header to spray liquid onto said carcass and said second fluid header to spray liquid onto said upwardly inclined fourth brush;
providing a lower pair of longitudinally disposed, parallel, downwardly inclined, elongate shafts sharing a common angle of inclination;
positioning said lower pair of shafts, including a fifth and a sixth shaft, so that said fifth and sixth shafts are transversely spaced apart from one another by a distance sufficient to accommodate an animal carcass therebetween;
attaching a plurality of radially disposed appendages to said fifth shaft, collectively forming a downwardly inclined fifth brush;
positioning a first and second fluid header adjacent said downwardly inclined fifth brush and adapting said first fluid header to spray liquid onto said carcass and said second fluid header to spray liquid onto said downwardly inclined fifth brush;
attaching a plurality of radially disposed appendages to said sixth shaft, collectively forming a downwardly inclined sixth brush;
positioning a first and second fluid header adjacent said downwardly inclined sixth brush and adapting said first fluid header to spray liquid onto said carcass and said second fluid header to spray liquid onto said downwardly inclined sixth brush;
providing an upper pair of longitudinally disposed, parallel, downwardly inclined, elongate shafts sharing a common angle of inclination;
positioning said upper pair of shafts, including a seventh and an eighth shaft, so that said seventh and eighth shafts are transversely spaced apart from one another by a distance sufficient to accommodate an animal carcass therebetween;
attaching a plurality of radially disposed appendages to said seventh shaft, collectively forming a downwardly inclined seventh brush;
positioning a first and second fluid header adjacent said downwardly inclined seventh brush and adapting said first fluid header to spray liquid onto said carcass and said second fluid header to spray liquid onto said downwardly inclined seventh brush;
attaching a plurality of radially disposed appendages to said eighth shaft, collectively forming a downwardly inclined eighth brush;
positioning a first and second fluid header adjacent said downwardly inclined eighth brush and adapting said first fluid header to spray liquid onto said carcass and said second fluid header to spray liquid onto said downwardly inclined eighth brush;
whereby said first, third, fifth, and seventh shafts carry said first, third, fifth, and seventh brushes, respectively, on a meat-side of the apparatus; and
whereby said second, fourth, sixth, and eighth shafts carry said second, fourth, sixth, and eighth brushes, respectively, on a bone-side of the apparatus.

11. The method of claim 10, further comprising the steps of:
providing a pair of vertically disposed, parallel, truncate shafts;
positioning said pair of shafts, including ninth and tenth shafts, so that said ninth and tenth shafts are longitudinally spaced apart from one another on said bone side of said apparatus;
attaching a plurality of radially disposed appendages to said ninth shaft, collectively forming a first vertical brush;
attaching a plurality of radially disposed appendages to said tenth shaft, collectively forming a second vertical brush;

positioning a first fluid header adjacent said first vertical brush in substantially parallel relation thereto and adapting said first fluid header to spray liquid onto said first vertical brush;

positioning a second fluid header adjacent said second vertical brush in substantially parallel relation thereto and adapting said second fluid header to spray liquid onto said second vertical brush;

positioning a third fluid header in horizontal disposition above said first and second vertical brushes in substantially centered relation thereto and adapting said third fluid header to spray liquid onto said carcass;

positioning said first and second vertical brushes between said upwardly inclined brush and said downwardly inclined brush on said bone side of said apparatus;

cleaning a neck area of a carcass in sequence by transporting said carcass between said upper and lower pairs of upwardly inclined brushes, said first and second vertical brushes, and said upper and lower pairs of downwardly inclined brushes while rotating all of said brushes in a downward direction and discharging liquid fluid from said fluid headers.

12. An apparatus for washing a split animal carcass, comprising:

a lower pair of longitudinally disposed, parallel, upwardly inclined, elongate shafts sharing a common angle of inclination;

said lower pair of shafts including a first and a second shaft that are transversely spaced apart from one another by a distance sufficient to accommodate an animal carcass therebetween;

a plurality of radially disposed appendages secured to said first shaft, collectively forming a first upwardly inclined truncate brush;

a second plurality of radially disposed appendages secured to said second shaft, collectively forming a first upwardly inclined full-length brush;

an upper pair of longitudinally disposed, parallel, upwardly inclined, elongate shafts sharing a common angle of inclination;

said upper pair of shafts including a third and a fourth shaft that are transversely spaced apart from one another by a distance sufficient to accommodate an animal carcass therebetween;

a plurality of radially disposed appendages secured to said third shaft, collectively forming a first upwardly inclined mid-length brush;

a plurality of radially disposed appendages secured to said fourth shaft, collectively forming a first upwardly inclined full-length brush;

a lower pair of longitudinally disposed, parallel, downwardly inclined, elongate shafts sharing a common angle of inclination;

said lower pair of shafts including a fifth and a sixth shaft that are transversely spaced apart from one another by a distance sufficient to accommodate an animal carcass therebetween;

a plurality of radially disposed appendages secured to said fifth shaft, collectively forming a first downwardly inclined truncate brush;

a plurality of radially disposed appendages secured to said sixth shaft, collectively forming a first downwardly inclined full-length brush;

an upper pair of longitudinally disposed, parallel, downwardly inclined, elongate shafts sharing a common angle of inclination;

said upper pair of shafts including a seventh and an eighth shaft that are transversely spaced apart from one another by a distance sufficient to accommodate an animal carcass therebetween;

a plurality of radially disposed appendages secured to said seventh shaft, collectively forming a first downwardly inclined mid-length brush; and a plurality of radially disposed appendages secured to said eighth shaft, collectively forming a first downwardly inclined full-length brush;

whereby said second, fourth, sixth, and eighth shafts carrying said full-length brushes constitute a meat-side of the apparatus;

whereby said first, third, fifth, and seventh shafts carrying said truncate, mid-length, truncate, and mid-length brushes, respectively, constitute a bone-side of the apparatus;

whereby the upwardly inclined brushes are positioned at an entrance end of the apparatus; and whereby the downwardly inclined brushes are positioned at an exit end of the apparatus.

* * * * *